(12) United States Patent
Xu et al.

(10) Patent No.: US 10,462,457 B2
(45) Date of Patent: Oct. 29, 2019

(54) DYNAMIC REFERENCE MOTION VECTOR CODING MODE

(71) Applicant: GOOGLE LLC, Mountain View, CA (US)

(72) Inventors: Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 154 days.

(21) Appl. No.: 15/373,518

(22) Filed: Dec. 9, 2016

(65) Prior Publication Data

US 2017/0223350 A1 Aug. 3, 2017

Related U.S. Application Data

(60) Provisional application No. 62/330,491, filed on May 2, 2016, provisional application No. 62/288,553, filed on Jan. 29, 2016.

(51) Int. Cl.
| | |
|---|---|
| *H04N 19/105* | (2014.01) |
| *H04N 19/139* | (2014.01) |
| *H04N 19/176* | (2014.01) |
| *H04N 19/52* | (2014.01) |
| *H04N 19/109* | (2014.01) |

(52) U.S. Cl.
CPC ......... *H04N 19/105* (2014.11); *H04N 19/109* (2014.11); *H04N 19/139* (2014.11); *H04N 19/176* (2014.11); *H04N 19/52* (2014.11)

(58) Field of Classification Search
CPC .. H04N 19/105; H04N 19/109; H04N 19/139; H04N 19/176; H04N 19/52
USPC ................. 375/240.16; 365/240.16
See application file for complete search history.

(56) References Cited

U.S. PATENT DOCUMENTS 5,329,309 A * 7/1994 Dorricott ............. G11B 27/024
                                                      348/446
5,384,865 A    1/1995 Loveridge
                (Continued)

FOREIGN PATENT DOCUMENTS

EP      0477616 A2    4/1992
EP      0634873 A2    1/1995
                (Continued)

OTHER PUBLICATIONS

Wright, R. Glenn, et al.; "Multimedia—Electronic Technical Manual for ATE", IEEE 1996, 3 pp.

(Continued)

*Primary Examiner* — William C Vaughn, Jr.
*Assistant Examiner* — Jae N Noh
(74) *Attorney, Agent, or Firm* — Young Basile Hanlon & MacFarlane, P.C.

(57) ABSTRACT

Techniques are described to use a reference motion vector to reduce the amount of bits needed to encode motion vectors for inter prediction. A dynamic motion vector coding mode generates a ranked list of motion vector candidates using a distance between previously coded blocks and a current block, and the frequency of use of the motion vectors of those previously coded blocks. The list is used to assign the effective motion vectors to different inter-prediction modes, including a variable number of reference motion vector modes.

16 Claims, 8 Drawing Sheets

(56) References Cited

U.S. PATENT DOCUMENTS

| | | | |
|---|---|---|---|
| 5,600,377 A * | 2/1997 | David | H04N 5/145 348/441 |
| 5,801,778 A | 9/1998 | Ju | |
| 6,072,904 A | 6/2000 | Desai et al. | |
| 6,072,905 A | 6/2000 | Cucchi et al. | |
| 6,466,624 B1 | 10/2002 | Fogg | |
| 6,487,313 B1 | 11/2002 | De Haan et al. | |
| 6,560,366 B1 | 5/2003 | Wilkins | |
| 6,741,655 B1 | 5/2004 | Chang et al. | |
| 7,027,654 B1 | 4/2006 | Ameres et al. | |
| 7,085,401 B2 | 8/2006 | Averbuch et al. | |
| 7,260,148 B2 | 8/2007 | Sohm | |
| 7,343,044 B2 | 3/2008 | Baba et al. | |
| 7,499,492 B1 | 3/2009 | Ameres et al. | |
| 7,697,769 B2 | 4/2010 | Baba et al. | |
| 7,809,212 B2 | 10/2010 | Tulkki | |
| 8,045,620 B2 | 10/2011 | Dshikiri et al. | |
| 8,064,644 B2 | 11/2011 | Kokaram | |
| 8,229,174 B2 | 7/2012 | Kokaram | |
| 8,385,418 B2 | 2/2013 | Crawford et al. | |
| 8,611,415 B1 | 12/2013 | Xu et al. | |
| 8,761,261 B1 | 6/2014 | Wang | |
| 2001/0014124 A1 | 8/2001 | Nishikawa | |
| 2002/0003575 A1 | 1/2002 | Marchese | |
| 2002/0044693 A1 | 4/2002 | Ogawa | |
| 2003/0012281 A1 | 1/2003 | Cho et al. | |
| 2003/0053544 A1 | 3/2003 | Yasunari et al. | |
| 2005/0013367 A1 | 1/2005 | Gallant et al. | |
| 2005/0286635 A1 | 12/2005 | Kumar et al. | |
| 2006/0018381 A1 | 1/2006 | Luo et al. | |
| 2006/0062481 A1 | 3/2006 | Suvanto | |
| 2006/0176316 A1 | 8/2006 | Nagasaki et al. | |
| 2006/0245499 A1 | 11/2006 | Chiu et al. | |
| 2008/0002772 A1 | 1/2008 | Song et al. | |
| 2009/0080523 A1 | 3/2009 | McDowell | |
| 2009/0122866 A1 | 5/2009 | Crawford et al. | |
| 2011/0194608 A1 | 8/2011 | Rusert et al. | |
| 2012/0044998 A1 | 2/2012 | Kokaram | |
| 2012/0213280 A1 | 8/2012 | Srinivasan et al. | |
| 2013/0208795 A1 * | 8/2013 | Xu | H04N 19/52 375/240.16 |
| 2013/0271666 A1 | 10/2013 | Crawford et al. | |
| 2014/0133570 A1 * | 5/2014 | Lee | H04N 19/593 375/240.16 |
| 2016/0050411 A1 | 2/2016 | Wang | |

FOREIGN PATENT DOCUMENTS

| | | |
|---|---|---|
| EP | 0986252 A1 | 3/2000 |
| EP | 1854067 A2 | 11/2007 |
| EP | 1864502 A2 | 12/2007 |
| GB | 2307133 A | 5/1997 |
| GB | 2365244 A | 2/2002 |
| WO | 9922520 A2 | 5/1999 |
| WO | 2004056089 A2 | 7/2004 |
| WO | 2004082294 A1 | 9/2004 |
| WO | 2006072925 A2 | 7/2006 |
| WO | 2011095260 A1 | 8/2011 |
| WO | 2011128023 A1 | 10/2011 |
| WO | 2011146451 A1 | 11/2011 |
| WO | 2016028453 A1 | 2/2016 |

OTHER PUBLICATIONS

Zhang Kui, et al.; "Variable Block Size Video Coding With Motion Prediction and Motion Segmentation", SPIE vol. 2419, 1995, 9 pp.

Besag. J., On the statistical analysis of dirty pictures. Journal of the Royal Statistical Society B, 48:259-302, 1986.

Biemond, J., L. Looijenga, and D.E. Boekee. A pel-recursive Wiener-based displacement estimation algorithm. Signal Processing, 1987.

Bierling, M., Displacement estimation by heirarchical block matching. In SPIE VCIP, pp. 942-951, 1988.

Black, M.J., and P. Anandan. A framework for the robust estimation of optical flow. In Fourth International Conf. on Computer Vision, pp. 231-236, May 1993.

Boroczy, L., J.N. Driessen, and J. Biemond. Adaptive algorithms for pel-recursive displacement estimation. In Proceedings SPIE VCIP, pp. 1210-1221, 1990.

Chen, M-J, et al., Fast variable block-size motion estimation by merging refined motion vector for H.264, IEICE Transactions on Communications, Communications Society, Tokyo, JP, vol. E89B, No. 10, Oct. 1, 2006 pp. 2922-2928.

Denman, H., N. Rea, and A. Kokaram. Content based analysis for video from snooker broadcasts. In International Conference on Image and Video Retrieval CIVR2002, Jul. 18-19, 2002.

Higgins. H. The interpretation of a moving retinal image. Proceedings of the Royal Society, London, B 208:385-397, 1980.

Higgins. H., The visual ambiguity of a moving plane. Proceedings of the Royal Society, London, B 223:165-175, 1984.

Horn and B. Schunck. Determining optical flow. Artificial Intelligence, 17:185-203, 1981.

J.-S. Kim and R.-H. Park. A fast feature-based block matching algorithm using integral projections. IEEE J. Selected Areas in Communications, 10(5):986-971, Jun. 1992.

Kim et al., "Mapping parameter estimation using integral projections and segmented moving objects in object-oriented analysis-synthesis coding"; Optical Engineering 35(1), p. 156-165 (Jan. 1996).

Kokaram, A, R. Dahoyt, F. Pitie, and H. Denman. Simultaneous luminance and position stabilization for film and video. In Visual Communications and Image Processing, San Jose, California USA, Jan. 2003.

Kokaram. "On Missing Data Treatment for Degraded Video and Film Archives: A Survey and a New Bayesian Approach", IEEE Transactions on Image Processing, vol. 13, No. 3, pp. 397-415, 2004.

Kokoram, A, and P. Delacourt. A new global estimation algorithm and its application to retrieval in sports events. In IEEE International Workshop on Multimedia Signal Processing, MMSP '01, pp. 3-5, Oct. 2001.

Murat A. Tekalp, Block-Based Methods, Digital Video Processing, Prentice Hall Processing Series, Aug. 12, 1995, pp. 98-116, Prentice Hall PTRMurat, A. Tekalp. Digital Video Processing. pp. 72-94, 177-197. Prentice Hall, 1995.

P. Helle, et.al., "Block merging for quadtree-based partitioning in HEVC", IEEE Transactions on Circuits and Systems for Video Technology, vol. 22, No. 12, Dec. 2012.

Konzali W. et al. A Quadree-Structured Variable Block Size for H264 Motion Estimation, 24 Picture Coding Symposium, Dec. 15, 2004, San Fransisco.

Puri A, et al., Interframe coding with variable block-size motion compensation, Global Telecommunications Conference, Tokyo, Nov. 15, 1987, IEEE, US, vol. 1, pp. 1.7.01-2.7.05.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Black, et al. "Robust Dynamic Motion Estimation Over Time", IEEE Computer Society Conference on Computer Vision and Pattern Recognition, pp. 296-302, 1991.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Crawford, et al., "Gradient based dominant motion estimation with integral projections for real time video stabilization", 2004 International Conference of Image Processing (ICIP) Oct. 24-27, 2004 vol. 5 pp. 3371-3374.

Dirk Robinson and Peyman Milanfar. Fast local and global projection-based methods for affine motion estimation. Journal of Mathematical Imaging and Vision, 18:35-54, 2003.

(56) References Cited

OTHER PUBLICATIONS

Ebrahimi, Touradj, et al.; "Joint motion estimation and segmentation for very low bitrate video coding", SPIE vol. 2501, 1995, 12 pp.
Elias, D.P. and N.G. Kingsbury. An efficient block segmentation algorithm for true motion estimation. In Sixth IEEE International Conference on Image Processing and Its Applications, vol. 1, pp. 209-213. IEEE Conference Publications 443, Jul. 14-17, 1997.
F. Dufaux and J. Konrad. Efficient, robust and fast global motion estimation for video coding. IEEE Transactions on Image Processing, 9:497-501, 2000.
Shanbari, M., The cross-search algorithm for motion estimation. IEEE Transactions on Communication, 38:950-953, Jul. 1990.
Guillotel, Philippe, et al.; "Comparison of motion vector coding techniques", SPIE vol. 2308, 1994, 11 pp.
Karczewicz, Marta, et al.; "Video Coding Using Motion Compensation with Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Kokaram, et al. "A System for Reconstruction of Missing Data in Image Sequences Using Sampled 3D AR Models and MRF Motion Priors", Computer Vision-ECCV '96. 4th European Conference on Computer Proceedings, vol. 2, pp. 613-624, 1996.
Kokaram, et al. "Automated Rig Removal with Bayesian Motion Interpolation", IEEE Conference Publication; 1st European conference on Visual Media Production, pp. 155-164, 2004.
Kokaram. AC, Motion Picture Restoration: Digital Algorithms for Artefact Suppression in Degraded Motion Picture Film and Video. Springer Verlag, ISBN 3-540-76040-7, pp. 13-46. 1998.
Lee, J. H., and J. B Ra. Block Motion estimation based on selective integral projections. In IEEE ICIP, vol. I, pp. 689-693, 2002.
Liu, Bede, et al. "A simple method to segment motion field for video coding", SPIE vol. 1818, Visual Communications and Image Processing 1992, 10 pp.
Liu Bede, et al. "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax with Data Partitioning and RVLC", ITU-Telecommunications Standardization Sector, Study Group 16, Video Coding Experts Group (Question 15), Sixth Meeting: Seoul, SouthKorea, Nov. 2, 1998, 34 pp.
Martin, Graham R., et al.; "Reduced Entropy Motion Compensation Using Variable Sized Blocks", SPIE vol. 3024, 1997, 10 pp.
Martinez. D.M, Model-based motion estimation and its application to restoration and interpolation of motion pictures. PhD thesis, Massachusetts Institute of Technology, 1986.
Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Odobez, J-M and P. Bouthemy. Robust multiresolution estimation of parametric motion models. Journal of visual commmunication and image representation, 6:348-365, 1995.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
P. Bouthemy, M. Gelgon, and F. Ganansia. A unified approach to shot change detection and camera motion characterization. IEEE Transactions on Circuits and Systems for Video Technology, 9:1030-1044, 1999.
P. Milanfar. A model of the effect of image motion in the radon transform domain. IEEE Trans. on Image Processing, 8(9):1276-1281, 1999.
P.H.S. Torr. Geometric motion segmentation and model selection. Philosophical Transactions of the Royal Society A, pp. 1321-1340, 1998.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme with Optimal Bit Allocation Among Segmentation, Motion, and Residual Error", IEEE Transactions on Image Processing, vol. 6, No. 11, Nov. 1997, 16 pp.
Seferidis, V. And M. Ghanbari. Heirarchical motion estimation using texture analysis. In IEEE 4th Conference on Image Processing, pp. 61-64, 1992.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp. cited byapplicant.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectortield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
VP6 Bitstream & Decoder Specification. Version 1.03. On2 Technologies, Inc. Dated Oct. 29, 2007.
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Bankoski et al, "VP8 Data Format and Decoding Guide", Independent Submission RFC 6389, Nov. 2011, 305 pp.
Kelly, et al. "Graphics Hardware for Gradient Based Motion Estimation", Proceedings of SPIE-IS&T Electronic Imaging, vol. 5309, No. 1, pp. 92-103, 2004.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video

(56) References Cited

OTHER PUBLICATIONS coding for generic audiovisual services, Version 3, International Telecommunication Union, Mar. 2005, 343 pp.
VP6 Bitstream and Decoder Specification, Version 1.03, (On2 Technologies, Inc.), Dated Oct. 29, 2007.
International Search Search Report & Written Opinion, Re: Application #PCT/US2015/042594 (citing new art); dated Nov. 25, 2015.
Han et al., "A Dynamic Motion Vector Referencing Scheme for Video Coding", 2016 IEEE International Conference on Image Processing, IEEE, Sep. 25, 2016, pp. 2032-2036.
Mukherjee et al., "The latest open-source video codec VP9—An overview and preliminary results", 2013 Picture Coding Symposium, IEEE, Dec. 8, 2013, pp. 390-393.
Bankoski, et al., "Technical Overview of VP8, An Open Source Video Codec for the Web", Jul. 11, 2011, 6 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Grange et al., "A VP9 Bitstream Overview", draft-grange-vp9-bitstream-00, Network Working Group, Feb. 18, 2013, 15 pgs.
U.S. Appl. No. 15/131,079, filed Apr. 18, 2019, 45 pgs.

\* cited by examiner

US 10,462,457 B2

DYNAMIC REFERENCE MOTION VECTOR CODING MODE

CROSS-REFERENCE TO RELATED APPLICATION(S)

This application claims priority to U.S. Provisional Application No. 62/288,553, filed Jan. 29, 2016, and to U.S. Provisional Application No. 62/330,491, filed May 2, 2016, each of which is incorporated herein in its entirety by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to video coding using reference motion vectors.

A method for decoding a video stream according to one implementation of this disclosure includes identifying, for a current block, a reference frame used to encode the current block within a current frame, creating a reference motion vector candidate list for the reference frame using reference blocks, ranking each motion vector within the reference motion vector candidate list by a distance from the current block to a reference block providing the motion vector, and by a popularity value of the motion vector that indicates a level of use of the motion vector by the reference block that indicates a level of use of the motion vector by the reference blocks, assigning the motion vectors to a plurality of inter-prediction modes based on the ranking, selecting an inter-prediction mode for decoding the current block, and decoding the current block using the inter-prediction mode. The reference blocks can including spatially adjacent blocks of the current frame, a collocated block within a previous frame, and spatially adjacent blocks of the collocated block within the previous frame, or other reference blocks.

An apparatus for decoding a video stream according to one implementation of this disclosure includes a processor and a memory. The memory is storing instructions that cause the processor to perform the method above.

A method for encoding a video stream according to one implementation of this disclosure include identifying, for each of a plurality of reference frames, candidate motion vectors for encoding a current block within a current frame using reference blocks, ranking the candidate motion vectors within a reference motion vector candidate list for a reference frame by a distance from the current block of a respective reference block providing a respective candidate motion vector, and by a popularity value of the motion vector that indicates a level of use of the motion vector by the reference blocks, assigning the motion vectors to a plurality of inter-prediction modes based on the ranking, selecting an inter-prediction mode for encoding the current block, and encoding the current block using the inter-prediction mode.

Variations in these and other aspects of the disclosure will be described in additional detail hereafter.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
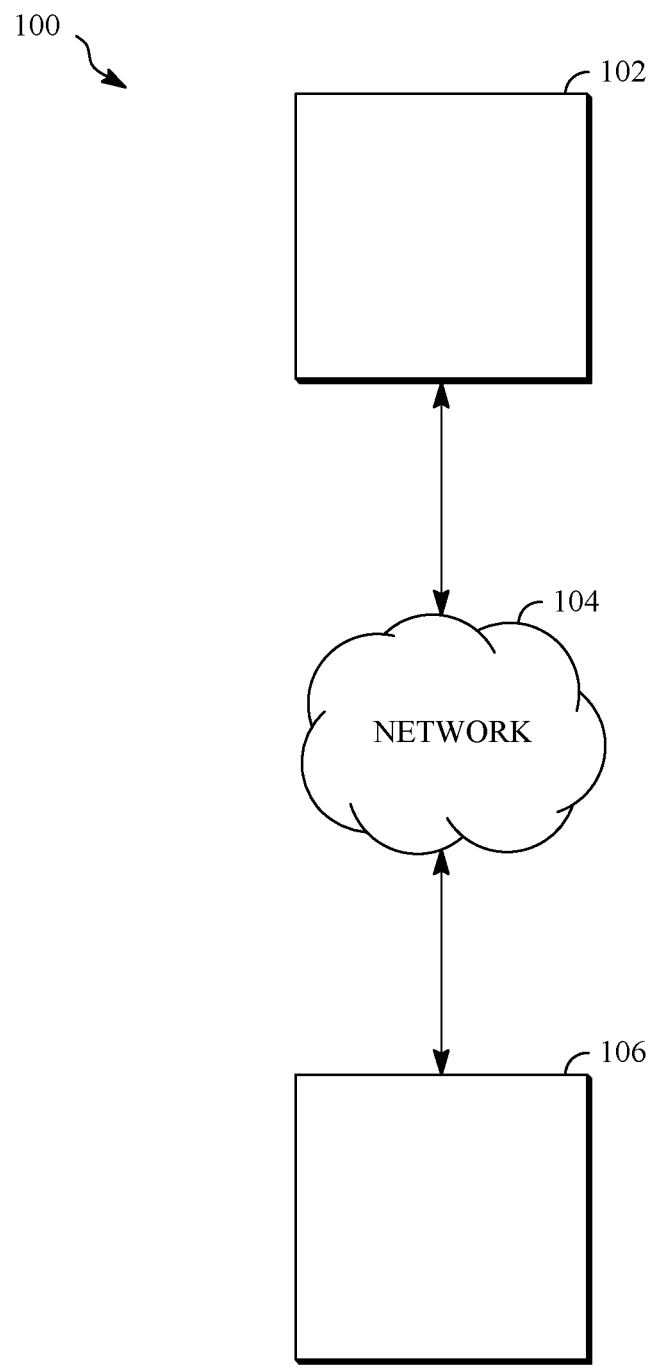
FIG. 1 is a schematic of a video encoding and decoding system.

Compression schemes related to coding video streams may include breaking each image into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. In this way, only the residual and parameters used to generate it need be added to the bitstream instead of including the entirety of the current block. This technique may be referred to as inter prediction.

One of the parameters in inter prediction is a motion vector that represents the spatial displacement of the previously coded block relative to the current block. The motion vector can be identified using a method of motion estimation, such as a motion search. In motion search, a portion of a reference frame can be translated to a succession of locations to form a prediction block that can be subtracted from a portion of a current frame to form a series of residuals. The X and Y translations corresponding to the location having the smallest residual can be selected as the motion vector. Bits representing the motion vector can be included in the encoded bitstream to permit a decoder to reproduce the prediction block and decode the portion of the encoded video bitstream associated with the motion vector.

For video compression schemes, the number of bits used to encode the motion vectors can be significant, especially for video streams encoded at lower data rates or higher compression ratios. To improve the encoding efficiency, a motion vector can be differentially encoded using a reference motion vector, i.e., only the difference between the motion vector and the reference motion vector is encoded. In some instances, the reference motion vector can be selected from previously used motion vectors in the video stream, for example, the last non-zero motion vector from neighboring blocks. Selecting a previously used motion vector to encode a current motion vector can further reduce the number of bits included in the encoded video bitstream and thereby reduce transmission and storage bandwidth requirements. Motion vector referencing modes allow a coding block to infer motion information from previously coded neighboring blocks.

The reference motion vector candidate list can be constructed according to the distance between the reference block and the current block being encoded. However, ranking solely according to the block distance ignores that a motion vector may be used by multiple blocks. How many pixels in a reference area are using the motion vector may indicate the likelihood that the motion vector is an effective motion vector for the current block.

As mentioned, neighboring blocks may be used to construct a reference motion vector candidate list. In order that the encoder and decoder are using the same information, previously coded blocks are used. When coding in raster scan order, this limits the neighboring blocks to those to the left and above the current block to the extent they are available. The collocated block from the previous frame (also called the last frame) can also be considered. However, the collocated block is a block located in the last frame having the same pixel location as the current block, so potentially useful motion information from the right and bottom of the current block is still omitted.

Regardless of how the reference motion vector candidate list is constructed, there may be a fixed number of motion vector referencing modes, such as two. The use of a fixed number of reference modes can be inefficient. For example, if the reference motion vector candidate list has less than the fixed number of motion vectors, zero motion vectors may be need to pad the modes without a motion vector. In other cases, the reference motion vector candidate list may have more than the fixed number of motion vectors. The omitted motion vectors may be better candidates than those kept—that is, an omitted motion vector may result in a better rate and/or less distortion in coding the current block.

In implementations of this disclosure, compression performance may be improved by employing an efficient reference motion vector ranking system, followed by a dynamic motion vector referencing mode that fully accounts for the available motion vector candidate list. In the ranking system, for example, reference motion vector candidates for blocks with a single reference frame may be ranked according to both relative distance from the current block and the coverage area (e.g., the use of the motion vector). For blocks with compound (e.g., two) reference frames, the candidate motion vectors from reference blocks that share the same reference frame combination may be ranked with a higher priority. Ranked below this are, optionally, combinations of motion vectors from neighboring blocks with a single reference frame. In the determination of motion vector candidates, motion information associated with blocks below and to the right of the collocated block may be considered so as to capture those directions of movement. Finally, the dynamic motion vector referencing mode may use a number of modes that is dependent on the size of reference motion vector candidate list so that the chance of losing potentially valuable reference information is reduced.

A reference motion vector may be selected from candidate motion vectors based on the distance between the reference block and the current block and the popularity of the reference motion vector. For example, the distance between the reference block and the current block can be based on the spatial displacement between the pixels in the previously coded block and corresponding collocated pixels in the current block, measured in the unit of pixels. For example, the popularity of the motion vector can be based on the amount of previously coded pixels that use the motion vector. The more previously coded pixels that use the motion vector, the higher the probability of the motion vector. In one example, the popularity value is the number of previously coded pixels that use the motion vector. In another example, the popularity value is a percentage of previously coded pixels within an area that use the motion vector.

Due to the proximity of the current block to pixels in the reference block, it is likely in many cases that the current block has similar motion characteristics to those pixels. Thus, a candidate motion vector used in a reference block near the current block may closely resemble the actual motion vector for the current block. Additionally, a candidate motion vector that is used by the most amount of pixels in a reference block near the current block would further resemble the actual motion vector for the current block. For this reason, the motion vector of the candidate motion vectors with the highest popularity used in a nearby reference block may be selected as the reference motion vector for the actual motion vector of the current block. Fewer bits can be used to code the actual motion vector by coding the small difference in motion vectors, thus improving the overall coding efficiency. Other ways in which the selected motion vector may be used are discussed hereinafter.

The candidate motion vectors may be limited to spatial-temporal neighboring motion vectors. That is, the pool of candidate motion vectors may be selected from regions neighboring regions of the current block. In some video coding schemes, particularly those where video frames are encoded out of order, it is desirable to include in the pool of candidate motion vectors motion information from video frames in the distant past or future. Encoding video frames can out of order may occur, for example, in the coding of so-called "alternate reference frames" that are not temporally neighboring to the frames coded immediately before or after them. An alternate reference frame may be a synthesized frame that does not occur in the input video stream or is a duplicate frame to one in the input video stream that is used for prediction and is generally not displayed following decoding. Such a frame can resemble a video frame in the non-adjacent future. Another example in which out of order encoding may occur is through the use of a so-called "golden reference frame," which is a reconstructed video frame that may or may not be neighboring to a current video frame and is stored in memory for use as a reference frame until replaced, e.g., by a new golden reference frame.

Herein, alternate reference frames and golden reference frames (also called alternate frames and golden frames), in addition to adjacent video frames, may be used to infer motion vector candidates for a block of a frame of video data. Other details are described herein after first describing an environment in which the disclosure may be implemented.

FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
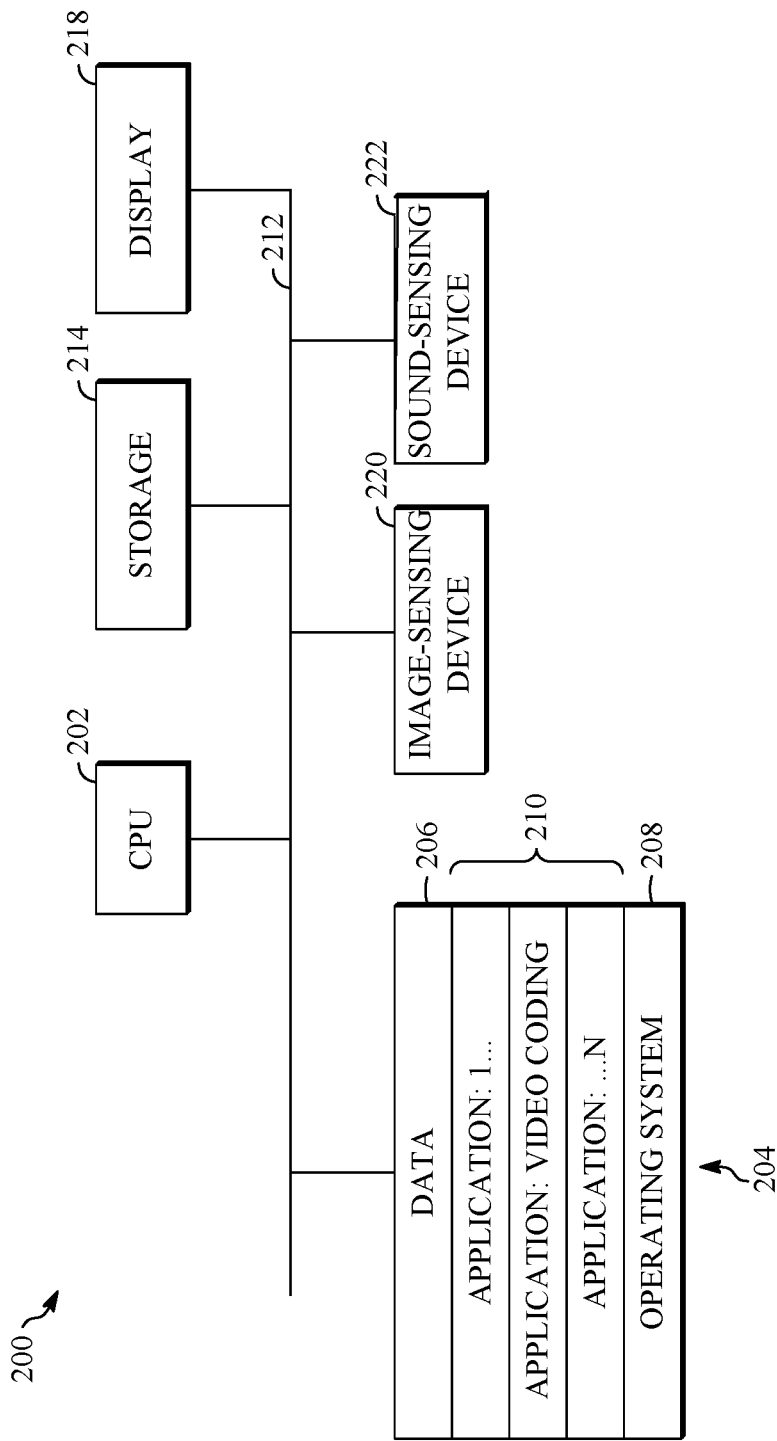
FIG. 2 is a block diagram of an example of a computing device that can implement a transmitting station or a receiving station.

The receiving station 106, in one example, can be a computer having an internal configuration of hardware such as that described in FIG. 2. However, other implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include additional memory in the form of a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
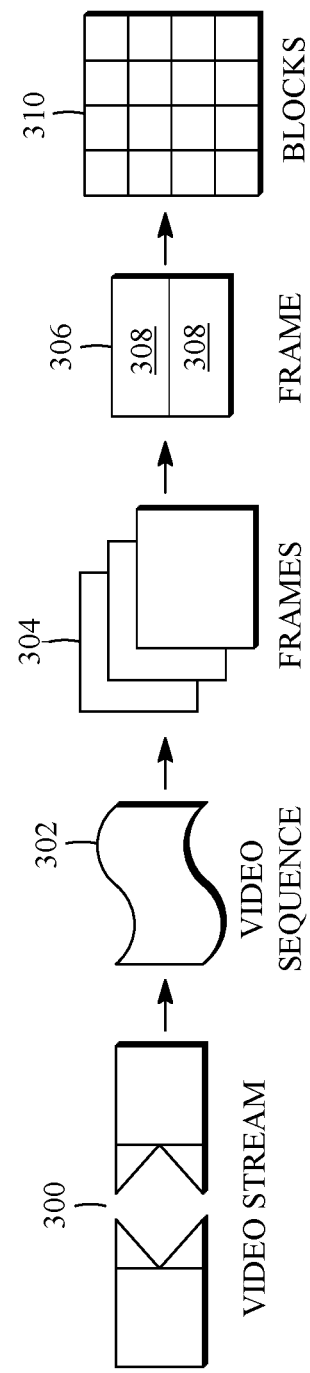
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments (or planes) 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in frame 306. The blocks 310 can also be arranged to include data from one or more planes of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 4:
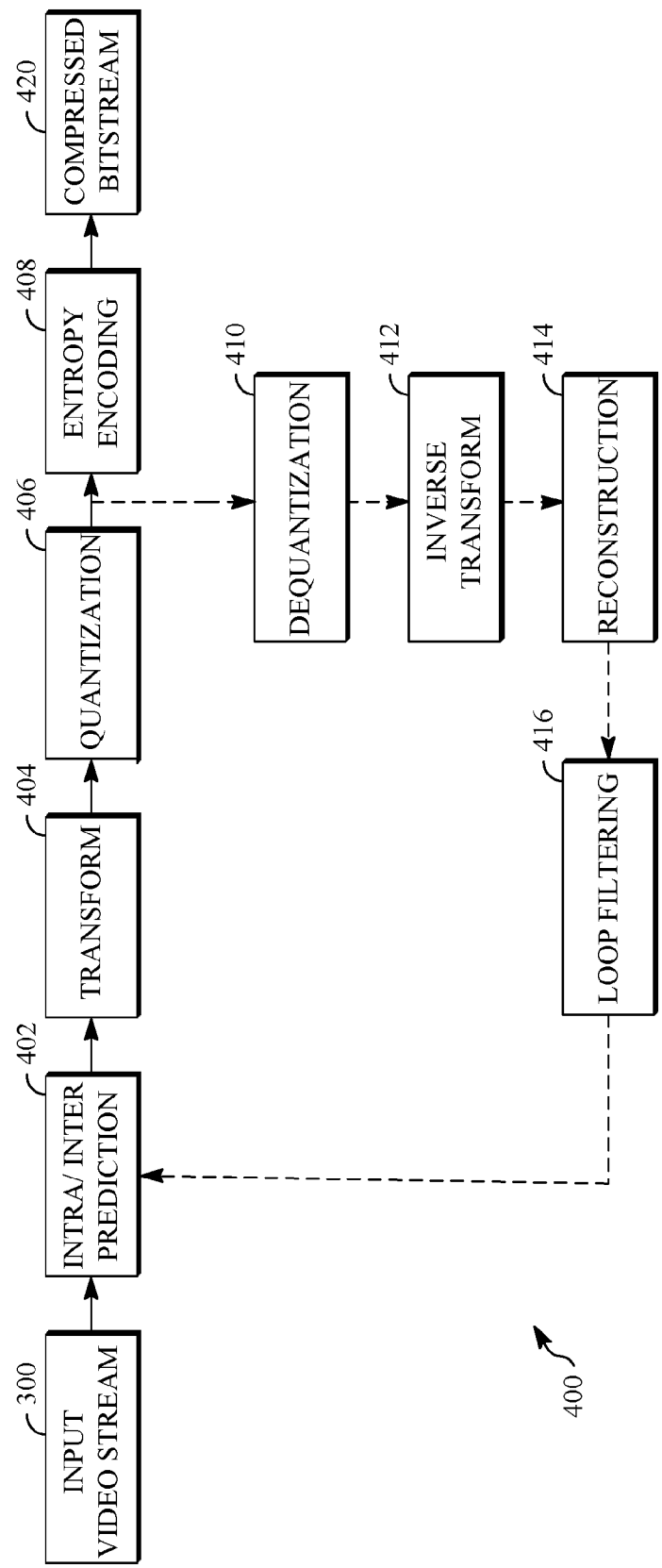
FIG. 4 is a block diagram of a video compression system according to an aspect of the teachings herein.

FIG. 4 is a block diagram of an encoder 400 in accordance with an implementation. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4 and in FIG. 6, below. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, each frame 306 can be processed in units of blocks. At the intra/inter prediction stage 402, each block can be encoded using intra-frame prediction (also called intra-prediction) or inter-frame prediction (also called inter-prediction), or a combination both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information needed to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
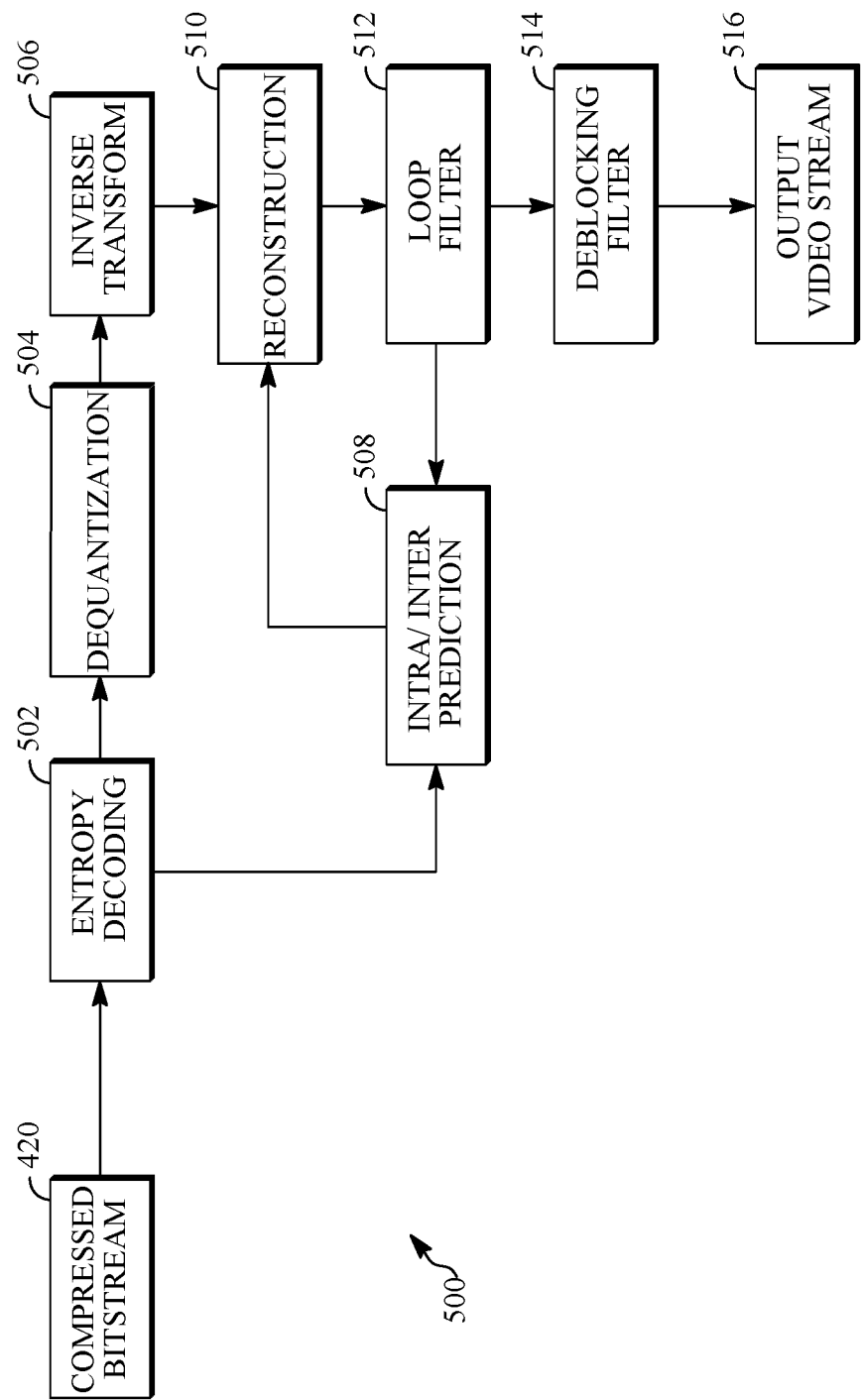
FIG. 5 is a block diagram of a video decompression system according to another aspect of the teachings herein.

FIG. 5 is a block diagram of a decoder 500 in accordance with another implementation. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5 and in FIG. 8 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514.

As mentioned briefly above, a block may be encoded or decoded by motion vector prediction a dynamic reference motion vector coding mode. One implementation of using the dynamic reference motion vector coding mode for encoding and decoding is next discussed.

Figure 6:
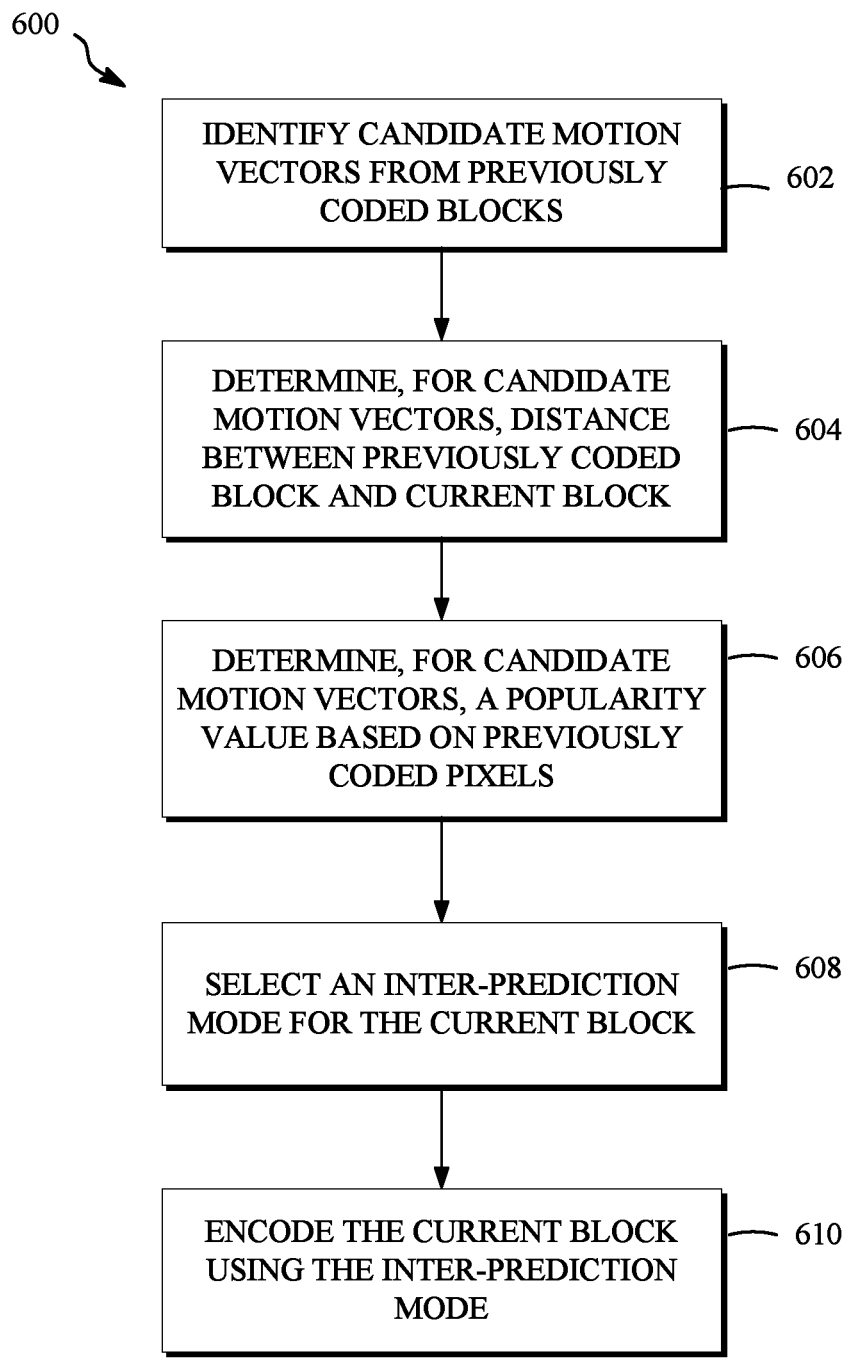
FIG. 6 is a flowchart diagram of a process for encoding a video stream using reference motion vectors in accordance with an implementation of this disclosure.

FIG. 6 is a flow diagram showing a process 600 for encoding a video stream using reference motion vectors in accordance with an implementation of this disclosure. Process 600 can be implemented in an encoder such as encoder 400 and can be implemented, for example, as a software program that can be executed by computing devices such as transmitting station 102 or receiving station 106. For example, the software program can include machine-readable instructions that can be stored in a memory such as memory 204 or 214, and that can be executed by a processor, such as CPU 202, to cause the computing device to perform process 600.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps. For simplicity of explanation, process 600 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be required to implement a method in accordance with the disclosed subject matter.

The process 600 assumes that a stream of video data having multiple frames, each having multiple blocks, is being encoded using a video encoder such as encoder 400 executing on a computing device such as transmitting station 102. The video data or stream can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder. At least some of the blocks within frames are encoded using inter prediction as described in more detail below.

At 602, the process 600 identifies candidate motion vectors from previously coded blocks in the video stream. The process 600 analyzes the motion activity of previously coded blocks to produce a list of ranked candidate motion vectors, employing an efficient reference motion vector ranking system, and provides a dynamic motion referencing mode that fully accounts for the available motion vector candidate list, which allows the number of the reference motion vector modes to be dynamically extended or shortened and improves the efficacy of entropy coding. The pool of the candidate motion vectors can be dynamically extended or shortened according to the neighboring reference block condition, i.e., how the list of candidate motion vectors is created. The previously coded blocks in the video stream can include any block encoded using inter-prediction before the current block, such as a block from a previously coded frame or a block from the same frame as the current block that has been encoded before the current block. For example, in some encoding/decoding (codec) schemes such as ones that code in raster scan order, the previously coded blocks can include a block above, to the left, or to the above-left of the current block in the same frame. The previously coded blocks can also include, for example, a block from the immediately previous frame (i.e., last frame), a block from the golden frame (described at intra/inter prediction stage 402), a block from any other reference frame, or any combination thereof. Desirably, however, the candidate motion vectors are obtained from previously coded blocks that correspond in some way to the current block based on the theory that such blocks, due to the proximity of their pixels to the current block, are likely to have similar motion characteristics to the current block.

Blocks may be predicted from a single reference frame or compound, such as two, reference frames. For blocks with a single reference frame, the process 600 identifies candidate motion vectors from the nearest spatial neighboring blocks that are associated with the reference frame. The candidate motion vectors may include the motion vector reference blocks within a reference coverage area, such as the motion vector(s) from a boundary area (e.g., a block) above the current block, the motion vector(s) from a boundary area (e.g., a block) to the left of the current block, the motion vector from a top-right corner of the current block, and the motion vector(s) from a collocated block in the previous frame. In certain implementations, motion vectors associated with blocks below and to the right of the collocated block are considered.

Figure 7:
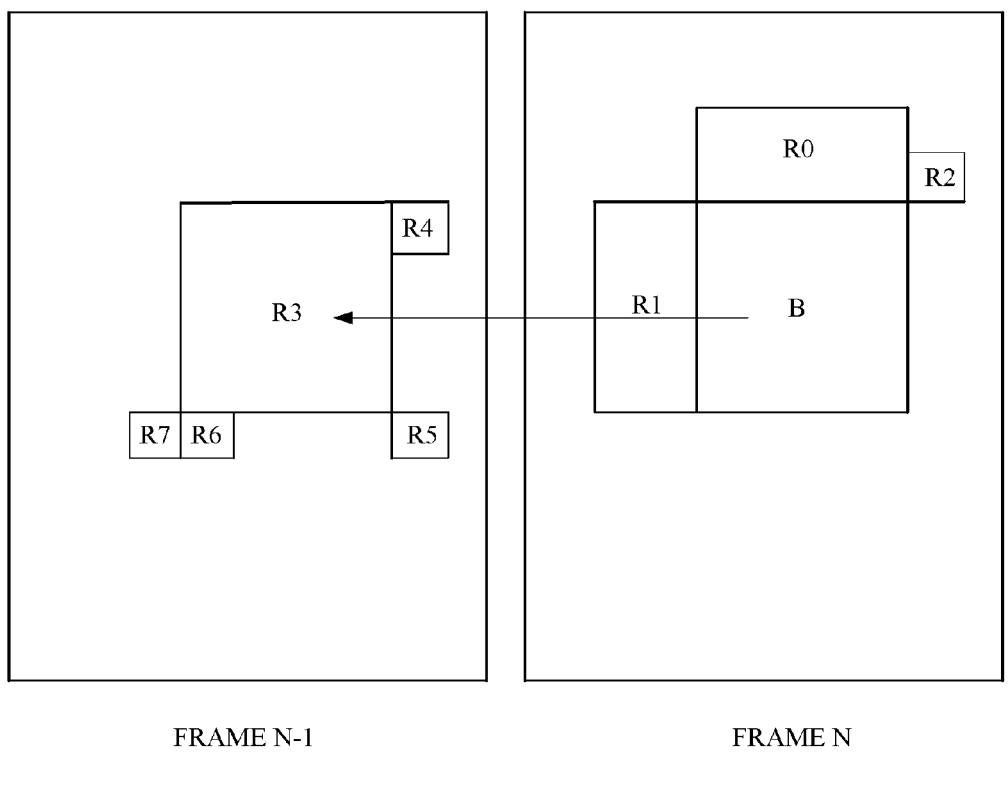
FIG. 7 is a diagram of a sequence of frames used to explain the identification of candidate motion vectors within the process of FIG. 6.

This initial step of constructing a reference motion vector candidate list is described with reference to FIG. 7. That is, FIG. 7 is a diagram of a sequence of frames used to explain the identification of candidate motion vectors of 602 within the process 600 of FIG. 6. The current block B being encoded is located within current Frame N. Frame N−1 is the preceding frame, also called a temporally adjacent frame, which may be the reconstructed frame stored in a so-called last reference frame buffer that is available for coding blocks of Frame N. In this case, block R3 is the collocated block to the current block B, and it is located at the same pixel location (usually measured from the top-left pixel) and has the same pixel dimensions in the x- and y-planes (i.e., the same pixel coordinates) within Frame N−1 as the current block B has within Frame N. Stated another way, the block R3 spatially corresponds to the current block B. In a single reference mode, i.e., where the current block B is being inter-predicted using a single reference frame, the motion vector candidate buffer is associated with the reference frame. Given the reference frame index, a search for motion vectors associated with the same reference frame may be performed through the reference blocks shown in FIG. 7 for inclusion in the candidate list.

The blocks B and R3 are of an arbitrary block size. For example, the blocks B and R3 may each be 32z32 pixels. As mentioned above, each frame may be partitioned into blocks for coding. Those blocks may be further partitioned into smaller blocks for coding purposes. For this reason, any block or region adjacent to the current block B may have been partitioned into smaller blocks that are predicted by different motion vectors. Therefore, the search for motion vectors may be take this into consideration by assessing the motion information for the smallest possible prediction block size within a frame. In the example shown, the search for motion vectors in the current frame is done using motion information from a top row boundary region, also called block R0, a left column boundary region, also called block R1, and the top-right corner, also call block R2. The blocks R0 and R1 are regions whose size (dimensions) is related to the size of the current block B. In some cases, the blocks R0 and R1 are of the same size as the current block B, but they may be half the size of the current block B or otherwise relate to the size of the current block B. In any case, each sub-block of pixels, e.g., having the smallest prediction block size within blocks R0 and R1 can be scanned through for candidate motion vectors. For example, the smallest prediction block size may be 8×8 or 4×4. The block R2 is desirably the smallest prediction block size to minimize searching and because more distant blocks are likely to provide less relevant information. The block R2 would only have one motion vector (or two in combined prediction) if the block R2 is the smallest prediction block size. The block R2 may be larger in size in an implementation.

The search for motion vectors in the last frame is done using motion information from the collocated block R3, and the additional reference blocks R4, R5, R6, and R7 adjacent to the bottom row (blocks R6, R7), the right column (R4), or both (R5). That is, they each proximate to (e.g., in contact with) a corner of the collocated block. As mentioned, the collocated block R3 has the same size as the current block. Each sub-block of the smallest prediction block size within the collocated block R3 may be scanned or searched for candidate motion vectors. In the example shown, the additional reference blocks R4, R5, R6, and R7 respectively have the smallest prediction block size regardless of the size of the current block B, but this is not required.

Returning now to FIG. 6, once the reference motion vectors are obtained at 602 they can be ranked according to the distance from the corresponding reference block and its overlapped length with the current block at 604. Stated another way, the process 600 may determine, for each candidate motion vector, a distance between the previously coded block associated with the candidate motion vector and the current block. The motion vectors from the nearest row and column boundaries and the top-right corner to the current block are in contact with the current block and may be considered to be more relevant and so are ranked higher than those further away. The distance may be used to group the motion vectors into categories. For example, and with reference to FIG. 7, any motion vectors from the sub-blocks of the reference blocks R0 and R1, and a motion vector from the reference block R2, if any, may be considered as category 1 candidate motion vectors, while the remaining candidate motion vectors from the blocks R3 through R7 and from any other sub-blocks of the reference blocks R0 and R1 are considered to be category 2 candidate motion vectors. In this case, category 1 candidate motion vectors would assume a higher priority than category 2 candidate motion vectors. The distance may additionally or alternatively include calculating a straight line distance between the centers of the current block and each of the reference blocks and/or sub-blocks of the reference blocks. The distance between the reference block and the current block can be based on the spatial displacement between the pixels in the previously coded block and the collocated pixels in the current block, measured in the unit of pixels. In these latter examples, a collocated block may be ranked higher than reference blocks in a current frame (e.g., because the difference/displacement is zero), even when popularity values are considered. Other ways of grouping and/or ranking the motion vectors based on distance are possible.

When the motion vectors are grouped by category, within each category the motion vectors may be ranked according to the number of pixels within the search areas (e.g., the previously coded pixels of at least some of the reference blocks) that are using each motion vector. For example, the process 600 may determine a popularity value based on the previously coded pixel values associated with the particular candidate motion vector at 606. The larger the number of previously coded pixel values associated with the candidate motion vector, the higher the popularity value of the candidate motion vector. The popularity value may be a raw number of pixels or a percentage of the total number of pixels within all or some of the reference blocks, for example.

This can be described with reference to the example of FIG. 7 assuming that the current block B and the collocated block R3, each comprise 32×32 pixels, the reference block R0 and the reference block R1 respectively comprise 32×16 and 16×32 pixels, and the reference blocks R2 and R4-R7 each comprise 8×8 pixels, which also corresponds to the smallest prediction block size. In this case, there could be up to nine motion vector candidates associated with a reference frame and assigned to category 1, four each from the 8×8 sub-blocks of reference blocks R0 and R1 adjacent to the current block B and one from the 8×8 reference block R2. There could be up to twenty-eight motion vectors associated with the reference frame and assigned to category 2, four each from the remaining 8×8 sub-blocks of the reference blocks R0 and R1, sixteen from the collocate block R3, and one each from the additional four 8×8 reference blocks R4-R7. In actuality, motion vectors are often re-used. Each of the unique motion vectors within a category from all of those identified is attributed with a popularity value corresponding to each of the groups of 8×8 pixels (that is, 64 pixels) using that motion vector. In assessing whether a motion vector that is identified at 602 is unique, the motion vector does not have to be identical to another. Ranges can be used so as to provide a motion vector candidate list demonstrating sufficient variation to useful. That is, a motion vector may be omitted within a category if it does not vary enough from a motion vector candidate already in a category, such as by 10% or some other variable. In this implementation, motion vectors are ranked by category and then ranked within the categories, but this is not required. The motion vector candidates may be grouped together for ranking based on the popularity value.

The reference motion vector candidate list may be constructed as described for each unique reference frame associated with a previously coded block or sub-block. For example, three reference frames may be available for each frame as described above—a last frame, an alternative (or alternate or alt) reference frame, and a golden reference frame. In this case, separate reference motion vector candidate list may be constructed using those previously coded blocks or sub-blocks having motion vectors pointing each of the last frame, the alt reference frame, and the golden reference frame. The last frame is updated for each frame, and the alt reference frame and golden reference frame may be updated less frequently.

In some implementations, motion vector scaling is performed when constructing a reference motion vector candidate list. Motion vector scaling may be done as part of the determination of a popularity value at 606, or may be done at other points in the process 600. Motion vector scaling adjusts the magnitude of a motion vector to account for the temporal differences between reference frames relative to the frame under consideration within the sequence of frames within the video stream. For example, and again with reference to FIG. 7, the reference block R2 uses the last frame, which is Frame N−1, for inter-prediction, while the reference block R4 uses the last frame, which is the frame preceding Frame N−1 (or Frame N−2, not shown), for inter-prediction. The temporal difference between the frame in which each block R2 and R4 is located (Frame N and Frame N−1, respectively) and the corresponding reference frame (Frame N−1 and Frame N−2, respectively) is one frame, so no scaling is indicated. In contrast, if the reference blocks R2 and R4 both use the golden reference frame, the temporal differences between Frame N and the golden reference frame and the between the Frame N−1 and the golden reference frame are different if the golden reference frame is unchanged. A candidate motion vector can be generated by scaling up the magnitude of the motion vector associated with the shorter temporal difference or scaling down the magnitude of the motion vector associated with the longer temporal differences so that the motion vectors share a common basis. The factor used for scaling can be based on a ratio formed by the temporal differences.

Motion vector scaling may also be used in implementations where only one reference motion vector candidate list is prepared for all reference frames, instead of separate lists for each reference frame. Reference frames may be located either before or after the current frame in the video sequence. In some implementations, motion vector scaling is omitted.

Thus far, candidate list construction for a single reference mode where one reference frame (and thus typically one motion vector associated with the one reference frame) is used for inter-prediction. In some cases, however, a block may be predicted from two or more reference frames, where the pixel values are combinations of the pixels values from prediction blocks within each frame generated by respective motion vectors. When considering a compound reference mode for prediction of the current block, the list is constructed by first looking for neighboring blocks that share the same compound reference frames (i.e., the same combination of reference frames) for their reference motion vectors. A higher priority is assigned to candidate motion vectors from neighboring reference blocks that share the combination of reference frames as that under consideration for the current block. The motion vectors may also be ranked from highest to lowest popularity value. If the resulting candidate list has a length shorter than a defined number, such as two, the list may be appended with combinations of reference motion vectors of single reference frames that are identified and ranked as described above. For example, if a compound reference mode that uses the last frame and the alt reference frame is under consideration, the reference blocks are searched for motion vectors referencing either the last frame or the alt reference frame, which are then ranked based on a popularity value as discussed.

Referring again to FIG. 6, and as explained above, the determination of the popularity values at 608 includes ranking the motion vectors using the popularity values. It can also include assigning the motion vectors to inter-coding (or inter-prediction) modes based on the ranking. The most popular motion vector may be selected for an inter-prediction mode that includes differential coding of a new motion vector. This may be referred to as a NEWMV mode. Then, according to the ranking results, the remaining motion vectors may be assigned to other reference vector motion modes. In some implementations, a REFMV mode is a dynamic reference motion vector coding mode that includes at least two modes where an existing motion vector is re-used. In an example, these two inter-prediction modes are a NEARESTMV mode and a NEARMV mode. The next motion vector in the ranking after the one assigned to the NEWMV mode (i.e., the motion vector with the second highest popularity value) is assigned to the NEARESTMV mode, and the next motion vector after that (i.e., the motion vector with the third highest popularity value) is assigned to the NEARMV mode. If the candidate reference motion vector list for a particular reference frame is longer than two, the number of reference motion vector modes may be extended to accommodate the remaining entries in the list. Another available inter-prediction mode may be a ZEROMV mode, which means that no motion exists.

At 608, an inter-prediction mode is selected for the current block. This may include testing each of the inter-prediction modes and selecting the inter-prediction mode that results in the most efficient coding of the current block. For example, the process 600 may be part of a rate-distortion loop used to select the inter-prediction mode for the current block to be encoded. As part of the rate-distortion loop, an actual motion vector for inter prediction of the current block may be determined through a motion search according to any number of motion searching techniques. For each reference frame, one use of the reference motion vector may include using the reference motion vector assigned to the NEWMV mode or one of the other identified candidate motion vectors as a starting parameter for the motion search algorithm based on the reasoning that the actual motion vector is likely to be close to highly ranked motion vectors for the reference frame. Combinations of reference frames in a compound prediction mode may be similarly searched using motion vectors from the candidate list, particularly those having the highest rank for each of the reference frames.

Motion searches may alternatively be performed without using motion vectors from the candidate lists. Whether or not a reference motion vector is used in the motion search, various inter-prediction modes may be tested. In one implementation, an exhaustive motion search that attempts each of the available inter-prediction modes using single or compound modes (i.e., using each of the three reference frames and combinations of reference frames). For each proposed motion vector and for each tested inter-prediction mode, a bit cost (also called a rate) of encoding the current block using the inter-prediction mode, including the bits required to signal the inter-prediction mode, the reference frame(s), the residual block generated from the current block, and, if required, one or more motion vector(s) or motion vector differential(s), and the resulting error in the pixel values between the original values and the reconstructed values (also called a distortion) are calculated. The inter-prediction mode and reference frame(s) resulting in the lowest rate-distortion value (also called a ratio) may be selected as the inter-prediction mode for the current block at 608.

An exhaustive search does not need to be performed. Various techniques may be used to reduce the computational burden. For example, the inter-prediction modes used for adjacent blocks in the frames may be tested first, and then only certain inter-prediction modes may be tested to see if an improved rate-distortion ratio results. Further, motion searching is applicable to inter-prediction. The rate-distortion loop may include tests for various intra-prediction modes, or a separate rate-distortion loop may be used to select the most efficient intra-prediction mode from available intra-prediction modes. Then, the most efficient inter-prediction mode and the most efficient intra-prediction mode are compared to select the prediction mode for the block.

Assuming here that the inter-prediction mode selected at 608 is better than the available intra-prediction modes, the current block is encoded at 610 using the inter-prediction mode. For example, if the NEWMV mode is used to encode the current block, the predicted block is generated using the actual motion vector(s) from the motion search and the selected reference frame(s). Then, the residual between the current block and the predicted block is generated and encoded as described with reference to FIG. 4. The motion vector(s) assigned to the NEWMV mode by the ranking can be used to differentially encode the actual motion vector(s). For example, a difference value or residual can be calculated by subtracting a reference motion vector from a motion vector used to encode the current block. The difference value can be encoded and included in the video stream. In addition, bits indicating the reference frame(s) and that the NEWMV mode was used may be indicated in the block header and/or in a frame or slice header.

In another example with a single reference frame, the motion search results in a motion vector equal to or within a range of values about one of the reference motion vectors assigned to reference motion vector modes. In this case the REFMV inter-prediction mode is indicated. If the motion vector resulting from the search is equal to or within a range of values about the reference motion vector assigned to the NEARMV mode in this example, the predicted block is generated using the reference motion vector assigned to the NEARMV mode and the selected reference frame. Then, the residual between the current block and the predicted block is generated and encoded as described with reference to FIG. 4. In addition, bits indicating the reference frame and that the REFMV mode and particularly the NEARMV mode was used may be indicated in the block header and/or in a frame or slice header.

The remaining inter-prediction modes may similarly be used to encode the current block, if selected at 608, or to encode other blocks of the frames within a video sequence. The process 600 of FIG. 6 may be repeated as needed.

As mentioned with respect to operation of the encoder 400 of FIG. 4, encoding the current block may include entropy coding. Entropy coding the inter-prediction modes may be modified to take into account the new dynamic reference motion vector modes. Assuming three inter-prediction modes corresponding to a new motion vector, a zero motion vector, and a dynamic reference motion vector mode, respectively the NEWMV mode, the ZEROMV mode, and REFMV mode in this example, entropy coding starts with the NEWMV mode. That is, assuming the current block is encoded using the NEWMV mode, the probability model may be selected according to two contexts: 1) how many reference motion vectors are found; and 2) if neighboring block(s) with a matched reference frame is found, how likely they are to be coded in the NEWMV mode.

If the next coding mode is not the NEWMV mode, coding continues if the next coding mode is the ZEROMV mode. In this case, the probability model may be selected according to two contexts: 1) if the collocated block in the last (or previous) frame using a zero motion vector, or close to a zero motion vector (i.e., less than one full pixel in both row and column components); and 2) whether (and possibly how many of) the spatial neighboring blocks within the current frame are using zero motion vectors, or close to zero motion vectors.

If instead the next coding mode is not the ZEROMV mode (i.e., is the dynamic reference motion vector mode indicated by the REFMV mode), a decision is made between the reference motion vectors as discussed above. The associated context is how many reference motion vectors are checked into the candidate list and, when applicable, their weighting coefficients used in compound prediction.

Figure 8:
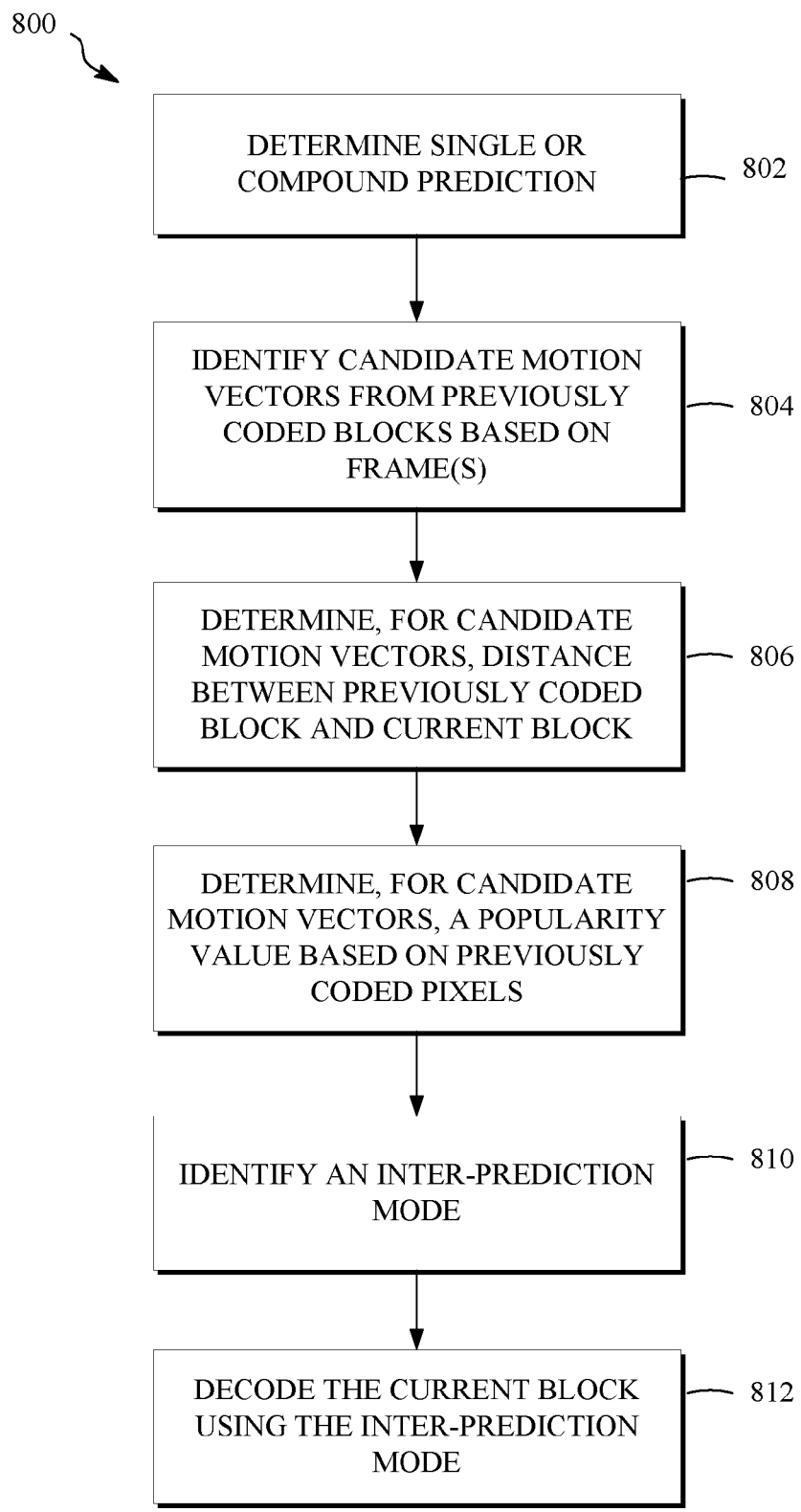
FIG. 8 is a flowchart diagram of a process for decoding an encoded video stream using reference motion vectors in accordance with implementations of this disclosure.

FIG. 8 is a flowchart diagram of a process 800 for decoding an encoded video stream using reference motion vectors in accordance with implementations of this disclosure. The process 800 can be implemented, for example, as a software program that may be executed by computing devices such as transmitting station 102 or receiving station 106. For example, the software program can include machine-readable instructions that may be stored in a memory such as memory 204 or 214, and that, when executed by a processor, such as CPU 202, may cause the computing device to perform the process 800. The process 800 can be implemented using specialized hardware or firmware. As explained above, some computing devices may have multiple memories or processors, and the operations described in the process 800 can be distributed using multiple processors, memories, or both.

For simplicity of explanation, the process 800 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

At 802, the decoder determines whether the current block was encoded using single or compound prediction. This information can be communicated by reading and decoding bits from an encoded video bitstream that indicate the one or more than one motion vectors was used to encode the current block. The encoded bitstream (or encoded video data) may be received by a decoder of a computing device in any number of ways, such as by receiving the video data over a network, over a cable, or by reading the video data from a primary memory or other storage device, including a disk drive or removable media such as a DVD, CompactFlash (CF) card, Secure Digital (SD) card, or any other device capable of communicating a video stream. This information can be included in a header associated with a current block or a frame header, for example. This explanation assumes that the current block is inter-predicted. Otherwise, no reference frame is encoded into the bitstream in association with the current block, and the current block was intra-predicted.

Knowing the reference frame(s), the candidate motion vectors can be ranked in a similar manner as described with reference to the process 600 of FIG. 6. That is, the encoder and decoder can share rules regarding the generation of reference motion vector candidate lists so that the decoder, receiving header information related to which inter-prediction mode was used to encode the current block (e.g., NEWMV, NEARESTMV, NEARMV, etc.), is able to identify the same reference motion vector(s) used by the encoder. First, the candidate motion vectors can be identified from previously coded blocks at 804 in a like manner as they are identified at 602 in the process 600. While the process 600 may identify the candidate motion vectors for ranking using all available reference frames and combinations of reference frames in order to select the inter-prediction mode, the process 800 only needs to rank those candidate motion vectors for the reference frame(s) actually to encode the block.

After the candidate motion vectors are identified at 804, they are ranked at 806 and 808. More specifically, ranking the candidate motion vectors includes determining, for each candidate motion vector, the distance between the previously coded block that is the source of the motion vector and the current block at 806. This involves the same operations as those described above with respect to the determination at 604 in the process 600. The result of this operation is a list of candidate motion vectors grouped by the distance in an embodiment. Then, determining a respective popularity value for the candidate motion vectors from previously coded blocks at 804 is performed the same as the determination at 606 in the process 600. The result of this operation is a ranked list of candidate motion vectors for the single reference frame or the combined reference frames used in the prediction of the current block. In one implementation, the highest ranked (e.g., most probable) motion vector is assigned to a NEWMV mode, and the next two motion vectors in the ranking are assigned respectively to the NEARESTMV and NEARMV reference motion vector modes of the dynamic reference motion vector (REFMV) mode. Any further reference motion vectors are assigned in sequence thereafter.

At 810, the inter-prediction mode that was used to encode the current block is identified. In one implementation, the inter-prediction mode is identified by decoding bits included within the bitstream that identify the inter-prediction mode. For example, the inter-prediction mode may be the new motion vector mode, the zero motion vector mode, or the dynamic reference motion vector mode. If the inter-prediction mode is the dynamic reference motion vector mode, the particular reference motion vector mode used can be similarly determined, e.g., from bits included within header(s) in the bitstream.

At 812, the inter-prediction mode identified at 810 is used to decode the current block at 812, such as through the decoding process described with reference to FIG. 5. When the inter-prediction mode involves a differentially-encoded motion vector, for example, the reference motion vector can be used to decode the motion vector used to predict the current block. Alternatively, the inter-prediction mode may indicate the motion vector by reference to the list. Regardless of the source of the one or more motion vectors, the prediction block is generated using the motion vector(s) and is added to the residual for the current block decoded from the bitstream.

The process 800 may be repeated for each block that is encoded using inter-prediction to generate a reconstructed block. The frame is reconstructed using the reconstructed blocks and those reconstructed using intra-prediction. By decoding a plurality of frames, an output video stream, such as the output video stream 516 shown in FIG. 5, can be reconstructed.

Use of the syntax within the bitstream for the REFMV mode suggests that the effective motion vector comes from referencing neighboring blocks' coding information. Given the reference frame, a list of such possible reference motion vector candidates are ranked according to their relative distance to the current block and their relative use. This technique generalizes the REFMV modes (NEARESTMV and NEARMV, for example) and improves the efficiency of entropy coding. Further, the additional motion vector candidates can result in further compression gains.

The aspects of encoding and decoding described above illustrate some encoding and decoding techniques. However, it is to be understood that encoding and decoding, as those terms are used in the claims, could mean compression, decompression, transformation, or any other processing or change of data.

The word "example," "aspect," or "implementation" is used herein to mean serving as an example, instance, or illustration. Any aspect or design described herein as using one or more of these words is not necessarily to be construed as preferred or advantageous over other aspects or designs. Rather, use of the word "example," "aspect," or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding a video stream including a processor, the method comprising:
   identifying, for a current block, a reference frame used to encode the current block within a current frame;
   creating a reference motion vector candidate list for the reference frame using reference blocks within at least one frame of the video stream;
   determining a popularity value of a motion vector within the reference motion vector candidate list, wherein the popularity value indicates a level of use of the motion vector by at least some of the reference blocks, and determining the popularity value comprises:
      calculating a number of previously coded pixels within the at least some of the reference blocks having values that were predicted using the motion vector, the popularity value determined using the number of previously coded pixels;
   ranking each motion vector within the reference motion vector candidate list by a distance from the current block to a reference block providing the motion vector, and by the popularity value of the motion vector;
   assigning the motion vectors to a plurality of inter-prediction modes based on the ranking;
   selecting an inter-prediction mode for decoding the current block;
   decoding the current block using the inter-prediction mode;
   determining whether the current block was encoded using single or compound prediction, wherein single prediction comprises using only one reference frame for inter prediction of the current block and compound prediction comprises using at least two reference frames for inter prediction of the current block;
   in response to determining that the current block was encoded using compound prediction:
      identifying the reference frame used to encode the current block comprises identifying a first reference frame and a second reference frame used to encode the current block; and
      creating the reference motion vector candidate list for the reference frame comprises creating a first reference motion vector candidate list for the first reference frame and creating a second reference motion vector list for the second reference frame using the reference blocks.

2. The method of claim 1, wherein the larger a number of previously coded pixels within the at least some of the reference blocks using a motion vector within the reference motion vector candidate list, the higher the popularity value of the motion vector.

3. The method of claim 1, wherein the popularity value comprises the number of previously coded pixels within the reference block.

4. The method of claim 1, wherein assigning the motion vectors comprises:
   assigning a motion vector having a highest popularity value in the ranking to an inter-prediction mode that includes differential coding of a new motion vector.

5. The method of claim 4, wherein assigning the motion vectors comprises:
   assigning a motion vector having a second highest popularity value to a dynamic reference motion vector inter-prediction mode as a first motion vector; and assigning a motion vector having a third highest popularity value to the dynamic reference motion vector inter-prediction mode as a second motion vector.

6. The method of claim 5, wherein the first motion vector is assigned to a NEARESTMV mode, and the second motion vector is assigned to a NEARMV mode.

7. A method for decoding a video stream including a processor, the method comprising:
identifying, for a current block, a reference frame used to encode the current block within a current frame;
creating a reference motion vector candidate list for the reference frame using reference blocks within at least one frame of the video stream;
determining a popularity value of a motion vector within the reference motion vector candidate list, wherein the popularity value indicates a level of use of the motion vector by at least some of the reference blocks, and determining the popularity value comprises:
calculating a number of previously coded pixels within the at least some of the reference blocks having values that were predicted using the motion vector, the popularity value determined using the number of previously coded pixels;
ranking each motion vector within the reference motion vector candidate list by a distance from the current block to a reference block providing the motion vector, and by the popularity value of the motion vector;
assigning the motion vectors to a plurality of inter-prediction modes based on the ranking;
selecting an inter-prediction mode for decoding the current block;
decoding the current block using the inter-prediction mode;
for each motion vector within the reference motion vector candidate list, determining the distance from the current block to the reference block providing the motion vector, wherein ranking each motion vector comprises:
grouping the motion vectors from the reference blocks in the current frame into a first category of candidate motion vectors;
grouping remaining motion vectors of the reference blocks that are not in the first category of candidate motion vectors into a second category of candidate motion vectors; and
ranking the first category of candidate motion vectors;
ranking the second category of candidate motion vectors; and
including the ranked motion vectors within the first category of candidate motion vectors ahead of the ranked motion vectors within the second category of candidate motion vectors in the reference motion vector candidate list.

8. The method of claim 7, wherein ranking each motion vector comprises:
within the first category of candidate motion vectors, ranking based on respective popularity values; and
within the second category of candidate motion vectors, ranking based on respective popularity values.

9. An apparatus for decoding a video stream, comprising:
a processor; and
a memory storing instructions that cause the processor to perform a method comprising:
identifying, for a current block, a reference frame used to encode the current block within a current frame;
creating a reference motion vector candidate list for the reference frame using reference blocks, the reference blocks including spatially adjacent blocks abutting the current block, a collocated block within a previous frame, and spatially adjacent blocks abutting the collocated block within the previous frame, wherein at least some of the reference blocks have a size different from the current block;
determining a popularity value of a motion vector within the reference motion vector candidate list, wherein the popularity value indicates a level of use of the motion vector by the reference blocks, and determining the popularity value comprises:
calculating a number of previously coded pixels within the reference blocks having values that were predicted using the motion vector, the popularity value determined using the number of previously coded pixels;
ranking each motion vector within the reference motion vector candidate list by a distance from the current block to a reference block providing the motion vector, and by the popularity value of the motion vector;
assigning the motion vectors to a plurality of inter-prediction modes based on the ranking;
selecting an inter-prediction mode for decoding the current block; and
decoding the current block using the inter-prediction mode.

10. The apparatus of claim 9, wherein the instructions for decoding the current block comprise instructions for decoding the current block using a motion vector assigned to the inter-prediction mode to inter-predict the current block.

11. The apparatus of claim 9, wherein determining the popularity value comprises determining a percentage of the number of previously coded pixels as compared to a total number of previously coded pixels of the reference blocks.

12. The apparatus of claim 9, wherein the reference frame is a first reference frame of at least two available reference frames, and the instructions for creating a reference motion vector candidate list for the reference frame comprise instructions for creating a single motion vector candidate list for the at least two available reference frames.

13. The apparatus of claim 12, wherein the instructions further comprise instructions for:
determining a first temporal difference between the current frame and the first reference frame;
determining a second temporal difference between the current frame and a second reference frame of the at least two available reference frames;
including a first motion vector associated with the first reference frame in the reference motion vector candidate list; and
responsive to the first temporal difference being longer than the second temporal difference, scaling up a magnitude of a second motion vector associated with the second reference frame for inclusion in the reference motion vector candidate list; and
responsive to the first temporal difference being shorter than the second temporal difference, scaling down a magnitude of a second motion vector associated with the second reference frame for inclusion in the reference motion vector candidate list.

14. The apparatus of claim 9, wherein the spatially adjacent blocks of the collocated block within the previous frame each comprise a smallest available prediction block size and are in contact with a respective corner of the collocated block.

15. The apparatus of claim 9, wherein the instructions further comprise instructions for calculating the popularity value for each motion vector within the reference motion vector candidate list.

16. The apparatus of claim 9, wherein the instructions for creating the reference motion vector candidate list comprises instructions for:
  searching for a reference frame index of the reference frame for motion vectors used to inter-predict the reference blocks; and
  including any of the motion vectors used to inter-predict the reference blocks having the reference frame index in the reference motion vector candidate list.

* * * * *